United States Patent [19]
Leavitt

[11] 3,835,194
[45] Sept. 10, 1974

[54] PROCESS FOR THE PREPARATION OF TETRAKIS (HYDROXYMETHYL) PHOSPHONIUM OXALATE

[75] Inventor: Julian Jacob Leavitt, Plainfield, N.J.

[73] Assignee: American Cyanamid Company, Stamford, Conn.

[22] Filed: Oct. 18, 1973

[21] Appl. No.: 407,709

[52] U.S. Cl............ 260/606.5 F, 117/136, 252/8.1
[51] Int. Cl. .............................................. C07f 9/28
[58] Field of Search................ 260/606.5 F, 606.5 P

[56] References Cited
UNITED STATES PATENTS

| | | | |
|---|---|---|---|
| 2,743,299 | 4/1956 | Flynn et al. .................. | 260/606.5 F |
| 3,013,085 | 12/1961 | Buckler ......................... | 260/606.5 F |
| 3,666,817 | 5/1972 | Carlson ......................... | 260/606.5 F |

Primary Examiner—Daniel E. Wyman
Assistant Examiner—A. P. Demers
Attorney, Agent, or Firm—H. G. Jackson

[57] ABSTRACT

Tetrakis(hydroxymethyl)phosphonium oxalate is prepared by reacting formaldehyde with phosphine and oxalic acid with vigorous agitation without the use of a catalyst. The product is useful as a flame retardant for cellulose fabrics.

3 Claims, No Drawings

PROCESS FOR THE PREPARATION OF TETRAKIS (HYDROXYMETHYL) PHOSPHONIUM OXALATE

BACKGROUND OF THE INVENTION

1. Field of the Invention

The invention pertains to an improved chemical process for the manufacture of tetrakis(hydroxymethyl)-phosphonium oxalate.

2. Description of the Prior Art

Tetrakis(hydroxymethyl)phosphonium salts have conventionally been made in a number of ways. In some instances, phosphine has been reacted with formaldehyde to form trishydroxymethylphosphine from which in a subsequent reaction with formaldehyde in the presence of an acid, the phosphonium salt is prepared.

U.S. Pat. No. 2,912,466 (1959) teaches the preparation of quaternary phosphonium salts using a one step reaction with the aid of a metal or metal salt catalyst. The oxalate salt synthesis is described using a metal catalyst and the patent also teaches that using oxalic acid in the process without a catalyst, phosphine absorption does not take place and the oxalate salt is not obtained.

Thus, the oxalate salt is described in the art as being obtainable by a one step reaction using a catalyst or by a two step process involving first the preparation of tris(hydroxymethyl)phosphine followed by reacting this product with formaldehyde and oxalic acid to form the quaternary phosphonium oxalate. Removal of catalyst and catalyst cost are particular disadvantages in the catalyst process. A particular disadvantage in the two step process is that it requires pressure which requires more expensive equipment.

I have discovered that tetrakis(hydroxymethyl)phosphonium oxalate is produced in an efficient and convenient one step process which involves the direct reaction of phosphine with formaldehyde and oxalic acid in the absence of a catalyst.

SUMMARY OF THE INVENTION

The invention is a process for preparing tetrakis(hydroxymethyl)phosphonium oxalate comprising reacting at least a stoichiometric amount of formaldehyde with phosphine and oxalic acid at a temperature of about 40°–75°C. and agitating the reaction vigorously.

DETAILED DESCRIPTION INCLUDING THE PREFERRED EMBODIMENTS

Tetrakis(hydroxymethyl)phosphonium oxalate is prepared by the reaction of phosphine with formaldehyde and oxalic acid at a temperature range between 40°–75°C. and preferably between 60°–65°C. The reaction may be carried out by any method which affords intimate contact of the reactants, achievable, for example, by vigorous agitation or preferably by using a system wherein phosphine is contacted with the reactants by introduction at the bottom of a column, countercurrent to liquid flowing from the top of the column, the liquid containing oxalic acid in an aqueous formaldehyde solution. To achieve even more intimate contact of the reactants, the reactor in the form of a column may be packed with high surface materials such as glass Raschig rings.

At least a stoichiometric quantity of formaldehyde is used for reaction with approximately stoichiometric amounts of phosphine and oxalic in the process to produce the product bis(tetrakis[hydroxymethyl]phosphonium)oxalate. The product may be isolated in pure form from the reaction mixture and is useful as a flame retardant for cellulose fabrics. A further advantage of the process of the invention is that the phosphonium oxalate salt is obtained in a solution which may be used as such in the preparation of pad baths for the flame retardant process without isolation of the oxalate salt.

Thus, contrary to the teachings of the art, I have discovered that tetrakis(hydroxymethyl)phosphonium oxalate is prepared in excellent yield and in a high purity without a catalyst using the process of the invention. The reaction product may be used directly in the preparation of pad baths for imparting flame resistance to fabrics. The use of the product is the subject of copending application Ser. No. 317,998 filed Dec. 26, 1972 wherein the oxalate salt is applied for flame retarding properties with organic nitrogenous components.

The invention is further illustrated by the following examples which are not to be construed as limitative.

EXAMPLE I

A solution of 38.3 grams of oxalic acid dihydrate in 193 grams of 37.8 percent formaldehyde solution is circulated and recirculated at 350 cc/min. through a glass columnar reactor and phosphine is passed through the column in the opposite direction countercurrent to the liquid flow at 340 cc/min. The column used is a 1.5 inch diameter glass column packed to a height of 19 inches with 0.25 inch glass Raschig rings. Throughout the reaction period the column temperature is maintained at 65°C. Conversion is complete within about 3 hours.

| Time (hours) | %P+ | % CH$_2$O* |
|---|---|---|
| 0 | 0 | 31.6 |
| 1 | 2.62 | 19.3 |
| 2 | 5.66 | 13.5 |
| 3 | 7.13 | 9.25 |
| 4 | 7.84 | 7.66 |

* The analytical method for formaldehyde includes the free formaldehyde and the formaldehyde required to convert THP to TKS.

EXAMPLE II

An aqueous solution of tetrakis(hydroxymethyl)-phosphonium oxalate containing approximately 38 grams of the oxalate salt prepared as described in Example I (without isolation of the oxalic salt) is used for the preparation of a pad bath for imparting flame retardancy to a cellulosic fabric. The pad bath also contains 7.2 parts of urea, 0.25 percent of a nonionic surfactant and 54.5 parts of added water. The pad bath is applied to 5.5 ozs./sq./yd. of bleached mercerized cotton sheeting. The pick-up is 100 percent thereby depositing on the fabric 3.0 percent phosphorus and 7.2 percent ureas on the weight of the fiber. The treated fabric is dried at 225°F. for 4 minutes and then heated at 325°F. for 4 minutes.

By such a process a fabric is obtained which shows acceptable flame retardance, durable through at least 70 washings using the Department of Commerce Test PFF 3–70 using a 3-second flame.

I claim:

1. A process for preparing tetrakis(hydroxymethyl)-phosphonium oxalate which comprises
   reacting at least a stoichiometric quantity of formaldehyde with phosphine and oxalic acid at a temperature between about 40°–75°C. and
   agitating the reaction mixture vigorously during the reaction.

2. A process according to claim 1 wherein the reaction is carried out in a columnar reactor and the phosphine is passed through the reactor countercurrent to a flow of aqueous oxalic acid-formaldehyde solution.

3. A process according to claim 2 wherein the reaction temperature is between 60°–65°C.

* * * * *